455-602 AU 233 EX

FIP8106 XR 3,911,363

United St[ates Patent] X5321D X5665D

Patten

[11] 3,911,363

[45] Oct. 7, 1975

[54] DELTA MODULATION CIRCUITRY WITH AUTOMATIC SQUELCH AND GAIN CONTROL

[75] Inventor: Michael Allen Patten, San Jose, Calif.

[73] Assignee: International Business Machines Corporation, Armonk, N.Y.

[22] Filed: Dec. 9, 1974

[21] Appl. No.: 530,903

[52] U.S. Cl. .............. 325/38 B; 332/11 D; 250/199

[51] Int. Cl.² .............. H04B 1/00

[58] Field of Search .............. 325/38 B, 38 R, 141; 332/11 D; 250/199

[56] References Cited

UNITED STATES PATENTS 3,808,366 4/1974 Wanamaker .............. 325/38 R

*Primary Examiner*—Albert J. Mayer

*Attorney, Agent, or Firm*—George E. Roush

[57] ABSTRACT

This delta modulating circuit arrangement is fully effective over a wide range of input signals through heavy background noise without periodic adjustment. The modulator circuit comprises an input comparator circuit driving a data-clocked flip-flop circuit that is flipped by a clocking pulse train. The output of the comparator circuit is integrated and applied to a differential amplifier circuit along with a positive or negative current obtained from the complementary output of the flip-flop circuit. The output of the differential amplifier is applied to the input of the comparator circuit. A balancing resistor is shunted across the differential amplifier circuit and adjusted to the mean between performance limits. An automatic gain controlled amplifying circuit is connected between the audio frequency input circuit and the comparator circuit to maintain the signal swing within the capabilities of the delta modulator circuit. Preferably, an optocoupler device is interposed between the amplifying and the comparator circuits for opening the circuit under control of a squelch control circuit to prevent modulating noise in the absence of signal.

12 Claims, 1 Drawing Figure

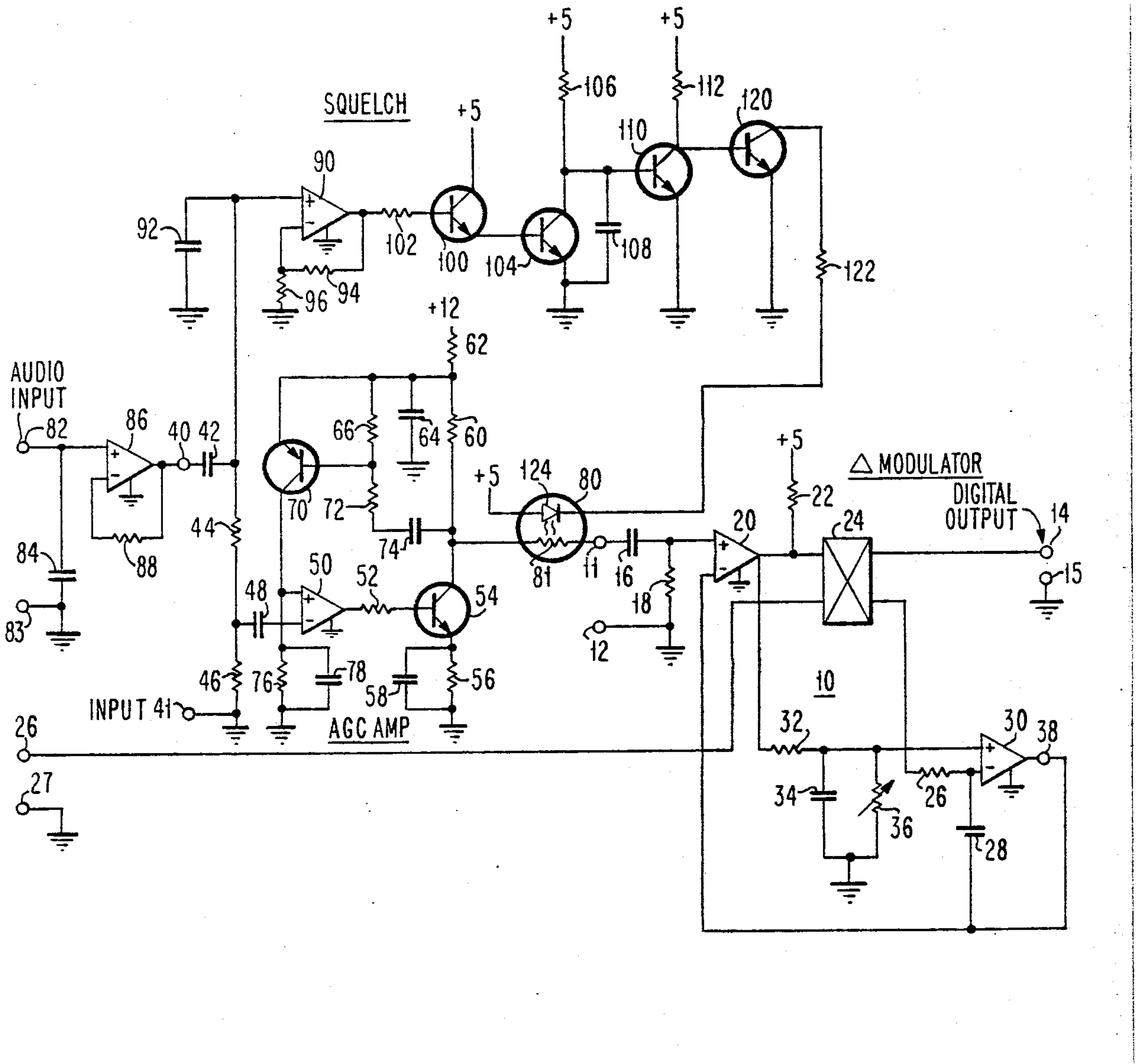
SQUELCH
AGC AMP
AUDIO INPUT
INPUT 41
△ MODULATOR
DIGITAL OUTPUT
+5
+12

DELTA MODULATION CIRCUITRY WITH AUTOMATIC SQUELCH AND GAIN CONTROL

The invention is related to that disclosed and claimed in the copending U.S. patent application, Ser. No. 475,682 now U.S. Pat. No. 3,892,925 of Dale Edward Fisk et al. filed on June 3, 1974 for "Electric Signal Exchange Switching Arrangement" in that the connections incorporating this invention in that arrangement are recited in the text of the related disclosure.

The invention relates to pulse code modulation circuitry and it particularly pertains to such circuitry for delta modulation.

Pulse code modulation is employed for representing analog signals in digital form. The analog signal is sampled at a fixed (clocking) rate and the amplitude at each sampling coded in digital format. Differential pulse code modulation is arranged for coding the differences in amplitudes of the succeeding pulses, while delta modulation is a special case wherein the differential quantization is represented by a binary unit (1) for an increase in value or a binary naught (0) for a decrease in value.

Delta modulation requires only the simplest coding and decoding circuitry. In many applications, however, such as in telephone message recording, the circuitry must be capable of handling a wide range of signals and reject background noise. As few as possible periodic adjustments are to be made to the circuitry in operation because of the heavy usage.

Delta modulation has been investigated by many and a large number of circuit arrangements have been developed. Examples of such arrangements that are prior art to the instant invention are to be found in the following U.S. Pat. Nos.:

| | | | |
|---|---|---|---|
| 3,173,092 | 3/1965 | Meschi | 325/38 |
| 3,461,244 | 8/1969 | Brolin | 179/15 |
| 3,706,944 | 12/1972 | Tweksbury | 332/11D |
| 3,746,990 | 7/1973 | LeDiberder | 325/38B |
| 3,750,143 | 7/1973 | Osborne | 340/347AD |
| 3,757,252 | 9/1973 | Deschenes | 332/11D |

and in the technical literature:

G. A. Hellworth and C. D. Jones: "Push-pull Feedback Delta Modulator;" IBM Technical Disclosure Bulletin, Vol. 11, No. 7; December 1968, pp 877–8.

G. D. Jones, Jr.: "Adaptive Delta Modulator;" IBM Technical Disclosue Bulletin, Vol. 13, No. 4; September 1970, pp. 860–1.

The patents to Meschi, Tweksbury, LeDiberder, and to Deschenes and the article to Jones, Jr., are directed to delta modulating circuitry employing but a single integrator circuit whereas the circuit according to the invention incorporates a second integrating circuit for overcoming problems that are inherent in these prior art arrangements as will be discussed later in greater detail.

The patent to Brolin is directed to delta modulating circuitry incorporating compression circuitry. The arrangement comprises a conventional delta modulator circuit of the same type as is basic to the circuitry of the invention, but in which another integrator is used in a level sensing circuit for controlling a variable step signal generating circuit connected in the modulator circuit for effecting the continuous syllabic compression desired.

The patent to Osborne is limited to integrating circuitry for delta modulation circuitry. Two or more capacitors are used in this arrangement, whereas, the instant invention uses integrating circuitry having but a single capacitor.

The article of Hellworth and Jones describes a delta modulation circuit that is superficially similar to that of the invention in that two integrating circuits are arranged for integrating complementary waves and for applying the integrated waves to a comparator circuit in feedback relationship. This arrangement lacks the advantages of the arrangement according to the invention wherein the two component integrated waves are combined in a different amplifying circuit to produce a composite integrated wave which is applied to a single input terminal of the comparator circuit leaving another input terminal completely free for application of the modulating wave as will be discussed later in greater detail.

The objects indirectly referred to hereinbefore and those that will appear as this specification progresses are attained in delta modulation circuitry having a comparator circuit to one terminal of which a modulating wave is applied for driving a data clocked flip-flop circuit delivering complementary output waves. The flip-flop circuit is triggered periodically by a modulator clocking pulse train. Complementary waves from the flip-flop circuit are integrated and combined in a differential amplifying circuit and the resulting composite wave applied to the other input terminal of the comparator circuit for determining the differential modulation at the suceeding clocking pulse as it triggers the flip-flop circuit to change the levels.

Further, according to the invention, the balancing feature is enhanced from the practical standpoint by an impedaance element connected in one of the integrating circuits. For a given application the impedance element, which can be a simple resistor in many cases, is adjusted to a value corresponding to the mean operating range and no further adjustment will be required.

A wider range of input modulating wave is accommodated by automatic control of the gain in signal wave repeating stages prior to the input circuit of the modulating circuit. This arrangement is also advantageous for incorporating a squelch circuits for preventing modulation or noise in the absence of a modulating wave. An optocoupler device is preferred in this circuitry in order to isolate the source of noise to the maximum degree. Sample-and-hold circuitry is readily incorporated in the circuitry according to the invention where such is found necessary or desirable.

In order that the full advantage of the invention obtain in practice, a preferred embodiment is described hereinafter with reference to the accompanying drawing forming a part of the specification and in which:

The sole FIGURE is a schematic diagram of delta modulation circuitry with automatic squelch and gain control according to the invention.

Referring to the schematic diagram, there is shown a delta modulator 10 to which a modulating wave is applied at a pair of input terminals 11,12 and a delta modulated wave is presented at a pair of output terminals 14,15. The wave is presented through a coupling capacitor 16 across an input circuit resistor 18 to a comparator circuit 20, which may be in the form of a level setting amplifier circuit as shown or any other comparator circuit which delivers a digital output wave of one level or another (1 or 0) in response to the difference in scope between input waves. A resistor 22 is connected to a junction between the comparator circuit 20 and the set terminal of a Date-Clocked (DC) flip-flop circuit 24 to apply positive energizing potential. The flip-flop circuit 24 is a conventional, commercially available item. Essentially, it is similar to a conventional Set-Reset (SR) flip-flop circuit with AND gating circuits at the input terminals connected so that the presence of data at clocking time will set the circuit (Q up) and the absence of signal at clocking time will reset the circuit (P up). The clocking terminal of the D-C flip-flop circuit is connected to a pair of terminals 26,27 at which a train of demodulator clocking pulses is applied. The digital delta modulated output wave is taken from the erect (directly proportional) output terminals of the D-C flip-flop circuit 24 and led to the output terminals 14,15. The complementary wave at the inverted (inversely proportional) output terminals of the flip-flop circuit 24 is applied to an integrator circuit comprising a resistor 26 and a capacitor 28 and a differential amplifying circuit 30. The output terminal of the comparator circuit 20 is connected by a resistor 32 to the other terminal of the differential amplifier circuit 30. A capacitor 34 and another resistor 36 are shunted from the other terminal of the amplifying circuit to a point of fixed reference potential, shown here as ground. The output terminal 38 of the amplifier circuit 30 is connected to the other input terminals of the comparator circuit 20 to complete the delta modulator circuit.

The resistor 26 and the capacitor 28 are given values at which the integration process follows the average level of the modulating wave. The resistor 32 and the capacitor 34 form another integrating circuit, while the resistor 36 is arranged for balancing the integrating operation. The time constant of the integrating circuit is primarily determined by the values of the resistor 32 and the capacitor 34, but the value of the resistor 36 preferably is also taken into account for following the modulating wave. The substantially different time constants of the integrator and the integrating circuits and the out-of-phase connections serve to balance the modulator by tending to bring the average level of the modulating wave back to zero or to the direct bias level and the adjustment of the resistor 36 serves to bring the circuitry to a coarse balance primarily at the beginning of operation. A one time adjustment is made to insure optimum self balancing. A value for the resistor 36 is determined for the best operation of the modulator as the mean value of resistance between values for low and high points of failure. The best value is satisfied by the closest value to 5% tolerance. Periodic adjustments are unnecessary with this basic modulator arrangement.

A wide range of input wave signal is accommodated by an amplifier with automatic control of the gain. The modulating wave is applied at input terminals 40,41 through a coupling capacitor 42 to a voltage divider comprising series connected resistors 44,46. The divider is required for supplying the proper level of signal through another coupling capacitor 48 to a variable gain amplifying circuit 50. A resistor 52 is connected to the output terminal of the amplifying circuit 50 and to a final amplifier transistor 54. The latter is self biased through a resistor 56 across which a bypass capacitor 58 carries alternating signal to a point of reference potential, shown here as ground. The collector electrode of the transistor 54 is connected to a load resistor 60 and a voltage dropping resistor 62. The latter resistance and a capacitor 64 isolates the circuit from noise originating in the power supply. An a.g.c. transistor 70 has the base electrode coupled through a resistor 72 and a capacitor 74 to the collector electrode of the final amplifying transistor 54. A bias resistor 66 is connected to the emitter electrode. The collector electrode of the transistor 70 is connected to the other input terminal of the differential amplifying circuit 50 for controlling the gain. An a.g.c. filter comprising a resistor 76 and a capacitor 78 maintain a decay rate of 30db/150ms. which provides an optimum level of signal for the integrator slope. Because of the dynamic range limitations of delta modulation, the modulation quality is improved by a.g.c. action even under controlled operations such as a vocabulary (speech) recording for applications of the audio response message recording type. Compression distortion is obviated because the time constant (76,78) is too slow to permit the system to follow envelope modulation but fast enough for the syllabic rate. The gain controlled output wave at the load resistor 60 is applied across the terminals 11,12 by means of an optocoupler device 80 having an electrocoupling element 81 connected as shown.

The specific circuit shown was constructed for a pulse amplitude modulation switching circuit arrangement having a sample-and-hold input stage. The input wave is applied at terminals 82,83 across a holding capacitor 84. A differential amplifier 86 having a feedback resistor 88 is connected to the terminals 82,83 and 40,41, as shown.

Audio frequency signal at the coupling capacitor 42 is applied to a squelch circuit having a +15db gain input amplifier 90. A capacitor 92 shunts the signal wave input terminal and a feedback resistor 94 and a shunt resistor 96 complete the input stage. The output of the amplifier 90 is connected to the base electrode of an emitter follower (empedance matching) transistor 100 by a resistor 102. The latter transistor is coupled directly to another transistor 104 in a circuit patterned after that credited to Darlington. This circuit comprises a load resistor 106 and a shunt capacitor 108. The values of the resistor 106 and the capacitor 108 are chosen to provide a (1.2 volt) threshold switch arranged for muting the input circuit of the modulator 10 if no signal is present for approximately 150 milliseconds. The muting is insured by a circuit comprising a further transistor 110 having a load resistor 112 and a muting control transistor 120. The latter transistor is coupled through a current limiting resistor 122 to the electro optical control element 124 of the optocoupler 80. When the control element 124 is excited, sufficient light is generated and impinges on the coupling element 81 to lower the resistance to a very low value and effectively couple the signal amplifier to the modulator 10.

The following component values were used in a delta modulator built along the lines schematically set forth in the sole figure and are given by way of example:

| Ref. No. | Component | Type or Value |
|---|---|---|
| 16 | coupling capacitor | 0.047 mfd. |
| 18 | input resistor | 10. Kilohms |
| 20 | comparator | Type LM 311 |
| 22 | resistor | 270 ohm |
| 24 | bilateral flip-flop circuit | ½ Type SN 7474 |
| 26 | resistor | *12 Kilohms |
| 28 | capacitor | *0.05 mfd. |
| 30 | differential amplifier | ½ Type SN 72747 |

-Continued

| Ref. No. | Component | Type or Value |
|---|---|---|
| 32 | resistor | 1 Kilohm |
| 34 | capacitor | *7.27 mfd. |
| 36 | resistor | *3.3 Kilohm |
| 42 | coupling capacitor | 0.47 mfd. |
| 44 | divider resistor | 5.1 Kilohm |
| 46 | divider resistor | 750 ohm |
| 48 | coupling capacitor | 0.22 mfd. |
| 50 | variable gain amplifier | Type MFC 6040 |
| 52 | coupling resistor | 2.2 Kilohms |
| 54 | amplifier transistor | Type 2N3904 |
| 56 | bias resistor | 3.9 Kilohms |
| 58 | bypass capacitor | 22 mfd. |
| 60 | load resistor | 2 Kilohms |
| 62 | dropping resistor | 10 ohms |
| 64 | smoothing capacitor | 22 mfd. |
| 66 | divider resistor | 51 Kilohms |
| 70 | agc transistor | Type 2N3906 |
| 72 | divider resistor | 10 Kilohms |
| 74 | capacitor | 2.7 mfd. |
| 76 | bias resistor | 10 Kilohms |
| 78 | bypass capacitor | 56 mfd. |
| 80 | optocoupler | Type VTL 2C3 |
| 84 | capacitor | 500 pfd. |
| 86 | differential amplifier | ½ Type SN 72747 |
| 88 | feedback resistor | 10 Kilohms |
| 90 | differential amplifier | ½ Type SN 72747 |
| 92 | smoothing capacitor | 470 pfd. |
| 94 | feedback resistor | 15 Kilohms |
| 96 | bias resistor | 1 Kilohm |
| 100 | transistor | Type 2N3904 |
| 102 | coupling resistor | 3.3 Kilohms |
| 104 | transistor | Type 2N3904 |
| 106 | resistor | 100 Kilohms |
| 108 | capacitor | 10 mfd. |
| 110 | driver transistor | Type 2N3904 |
| 112 | resistor | 10 Kilohms |
| 120 | control transistor | Type 2N3904 |
| 122 | current limiting resistor | 100 ohms |

*closer tolerances may be required depending on the application at hand.

The clocking rate was 18 Kilohertz.

The a.g.c. was arranged to allow an increase in gain to a maximum of 30db when speech ceased before the squelch circuit operated. This prevented the modulation of background noise which would otherwise be provided at a high level if no speech were present. Other limits are set according to the application at hand.

The power supplies delivered 5 volts and 12 volts between the terminals so marked and ground indicated by the conventional symbol. This circuit was particularly designed for voice telephone message recording systems, but those skilled in the art will readily apply the teaching herein to the application at hand as the invention is by no means limited to telephony.

The basic modulator as described has no enhancing circuitry for optimizing the slope modulation. However, those skilled in the art will readily incorporatae such enhancements into the circuitry shown and described.

While the invention has been shown and described with reference to a specific embodiment thereof, it should be understood that those skilled in the art will make changes without departing from the spirit and the scope of the invention as defined in the appended claims.

The invention claimed is:

1. Delta modulation circuitry with automatic gain and/or squelch control for use in a pulse amplitude modulation voice and data communications alternating current signal switching control, comprising:

a voice and/or data signal input circuit, and a delta modulating circuit of the type having a latch, a comparator and at least one integrator circuit, characterized in that a self balancing network is connected in the integrator circuit for balancing the modulator while eliminating periodic adjustment, and further characterized in that said input circuit is coupled to said modulating circuits by an electronic coupling circuit having a coupling element and an electroptical control element, an automatic gain controlling amplifying circuit is interposed between said input circuit and said coupling circuit having a differential amplifier and an a.g.c. level sensing circuit interconnected to reduce gain variation, and a squelch control circuit connected between said input circuit and the control element of said coupling circuit for opening the latter in the absence of said voice and/or data signal.

2. Delta modulation circuitry with automatic gain and squelch control for use in a pulse amplitude modulation alternating current voice frequency signal switching control comprising:

a comparator circuit having an audio frequency signal input terminal, a comparing input terminal and an output terminal, a latch circuit having a set terminal connected to said output terminal of said comparator circuit, reset and complementary output terminals, an integrator circuit having one input terminal connected to said latch circuit, another input terminal coupled to said output terminal of said comparator circuit and an output terminal connected to said comparing input terminal of said comparator circuit, a biasing network superimposed on the coupling between said input terminal of said integrator circuit and said output terminal of said comparator circuit and having one adjustable element for regulating the balancing of said integrating circuit, an audio frequency signal input circuit having an output terminal, an amplifier circuit having an input terminal connected to said output terminal of said signal input circuit and having an output terminal, an automatic gain control level detecting circuit connected to said output terminal of said amplifier circuit and having an output circuit coupled into the input circuit of said amplifier circuit, a squelch circuit having an input terminal connected to said output terminal of said signal input circuit and an audio frequency signal level output terminal, and an optocoupler device having an electrooptical control element connected to said signal level output terminal of said squelch circuit and an electric coupling element connected between said output terminal of said amplifier circuit and said audio frequency signal input terminal in said comparataor circuit.

3. Delta modulation circuitry comprising input terminals at which an electric modulating wave is applied, output terminals at which a differential pulse code modulated wave is presented, a comparator circuit having complementary input terminals and output terminals with one input terminal coupled to said wave input terminals, a modulator clock generator, a bilateral flip-flop circuit having a set terminal connected to the output terminals of said comparator circuit, a reset terminal to which a modulator clocking pulse train is applied, an erect output terminal connected to said modulated wave output terminals, and an inverted output terminal, a differential amplifier circuit having complementary input terminals and an output terminal at which a balanced integrated waveform is presented, an integrator circuit connected between one of said input terminals of said differential amplifier circuit and said inverted output terminal of said flip-flop circuit, an integrating circuit including balancing circuitry connected between the other input terminal of said differential amplifier circuit and said output terminal of said comparator circuit, and an electric connection between said output terminal of said differential amplifier circuit and the other input terminal of said comparator circuit.

4. Delta modulation circuitry as defined in claim 3 and incorporating balancing circuitry connected in said integrating circuitry.

5. Delta modulation circuitry as defined in claim 3 and wherein said integrating circuitry comprises a resistor having one terminal connected to said output terminal of said comparator circuit, a capacitor connected between the other terminal of said resistor and a point of reference potential, with the junction of said resistor and capacitor connected to said other input terminal of said differential amplifier circuit.

6. Delta modulation circuitry as defined in claim 5 and incorporating another resistor connected across said capacitor.

7. Delta modulation circuitry as defined in claim 6 and wherein said resistors and said capacitor have values at which said modulating circuit is balanced.

8. Delta modulation circuitry as defined in claim 3 and wherein said integrator and said integrating circuits have substantially different time constants.

9. Delta modulation circuitry as defined in claim 8 and wherein said integrator circuit has a time constant arranged for following the average level of the modulating wave, and said integrating circuit has a time constant arranged for following the modulating wave.

10. Delta modulation circuitry as defined in claim 3 and incorporating sample-and-hold circuitry interposed between said modulating wave input terminals and said one input terminal of said comparator circuit.

11. Delta modulation circuitry as defined in claim 3 and incorporating an automatic gain controlled amplifying circuit coupled between said modulating wave input terminals and said one terminal of said comparator circuit.

12. Delta modulation circuitry as defined in claim 11 and incorporating an optocoupler device having an electric coupling element interposed between said amplifying circuit and said one terminal of said comparator circuit and having an electrooptical control element responsive to the passage of current therethrough, and a squelch circuit having an input terminal coupled to said modulating wave input terminals and an output circuit coupled to said optical actuating element for coupling said amplifying circuit to said comparator in the presence of said modulating wave and decoupling in the absence in order to prevent modulation on noise presented in the circuitry prior to the input of said comparator circuit.

* * * * *